US008929464B2

(12) United States Patent
Kerofsky

(10) Patent No.: US 8,929,464 B2
(45) Date of Patent: Jan. 6, 2015

(54) VIDEO ENTROPY DECODING WITH GRACEFUL DEGRADATION

(75) Inventor: Louis Joseph Kerofsky, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 2738 days.

(21) Appl. No.: 11/089,647

(22) Filed: Mar. 25, 2005

(65) Prior Publication Data

US 2006/0215768 A1    Sep. 28, 2006

(51) Int. Cl.

| H04N 7/12 | (2006.01) |
| H04N 19/176 | (2014.01) |
| H04N 19/186 | (2014.01) |
| H04N 19/132 | (2014.01) |
| H04N 19/18 | (2014.01) |
| H04N 19/44 | (2014.01) |
| H04N 19/61 | (2014.01) |
| H04N 19/156 | (2014.01) |

(52) U.S. Cl.
CPC ... *H04N 19/00278* (2013.01); *H04N 19/00315* (2013.01); *H04N 19/00127* (2013.01); *H04N 19/00296* (2013.01); *H04N 19/00533* (2013.01); *H04N 19/00781* (2013.01); *H04N 19/00206* (2013.01)
USPC ..................................... 375/240.28

(58) Field of Classification Search
CPC .................. H04N 19/00127; H04N 19/00206; H04N 19/00278; H04N 19/00296; H04N 19/00315; H04N 19/00533; H04N 19/00781
USPC ........................................ 375/240.28, 240.18
See application file for complete search history.

(56) References Cited

U.S. PATENT DOCUMENTS

| 6,859,612 | B2 * | 2/2005 | Shida et al. ..................... 386/68 |
| 7,248,631 | B2 * | 7/2007 | Wilson ..................... 375/240.01 |
| 7,362,838 | B2 * | 4/2008 | Mizukami et al. ............ 375/362 |
| 7,643,559 | B2 * | 1/2010 | Kato et al. ................ 375/240.23 |
| 2002/0136461 | A1 | 9/2002 | Tan |
| 2002/0161809 | A1 | 10/2002 | Lan et al. |
| 2005/0259741 | A1 * | 11/2005 | Hellman .................. 375/240.18 |

* cited by examiner

*Primary Examiner* — Anner Holder
(74) *Attorney, Agent, or Firm* — Law Office Of Gerald Maliszewski; Gerald Maliszewski

(57) ABSTRACT

A system and method are provided for gracefully degrading video quality in a video entropy decoding system. The method comprises: accepting a sequence of coded video frames; measuring the speed at which the video frames are decoded; in response to the decoding speed, varying the degree of data decoded in each macroblock (MB) of a frame; and, supplying decoded video data from every MB in the frame. Though the degree of data decoded in each MB of the frame may vary, predictions from a first MB in a frame can still be used to decode a second MB in the frame. That is, synchronization is maintained between the first and second MB. Varying the degree of data decoded in each MB of the frame includes: decoding a minimal amount of data in each MB in the frame; and, varying the level of decoding performed on each MB in the frame.

23 Claims, 5 Drawing Sheets

Fig. 4

```
DECODE_STATUS_T residual(DECODER_T *pDec)
{
  if(pMb->i16x16)
  {
    DecodeMbCAVLC_Luma 16x16(pMb,pMB_available);
  }
  else
  {
    if((pMb->Intra) | | (!degrade_luma))
      status | =DecodeMbCAVLC_Luma4x4(pMb,pMB_available);
    else
      status | =DecodeMbCAVLC_Luma4x4_degraded(pMb,pMB_available);
  }
  // CHROMA DATA
  if((pMb->Intra) | | (!degrade_chroma))
    status | =DecodeMbCAVLC_Chroma(pMb,pMB_available);
  else
    status | =DecodeMbCAVLC_Chroma_degraded(pMb,pMB_available);
  return status;
}
```

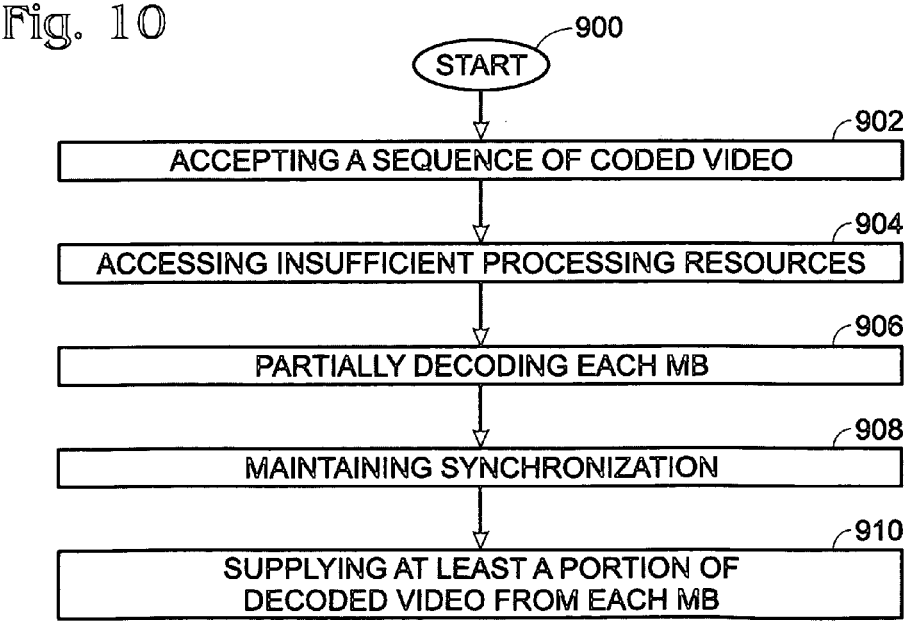

Fig. 10

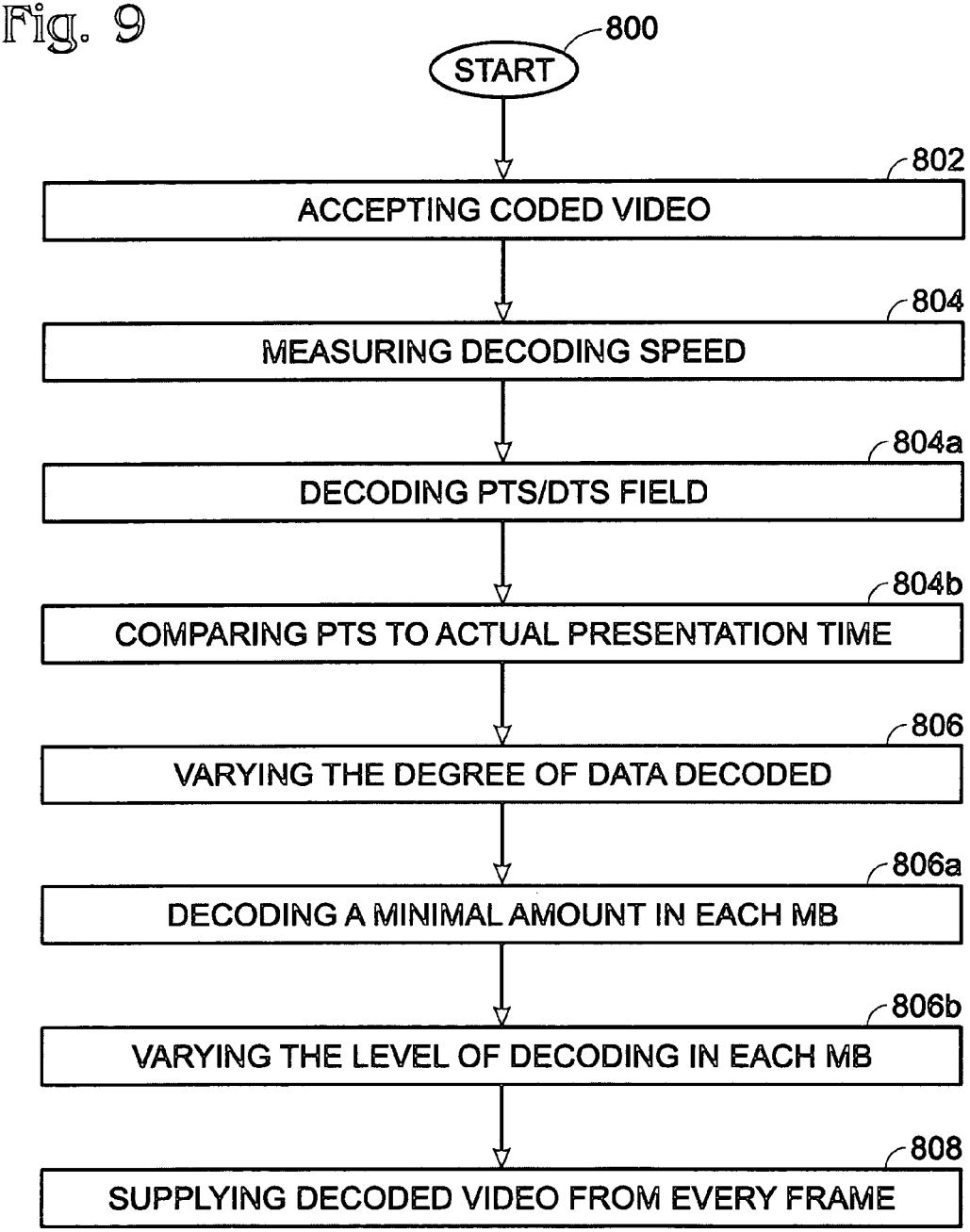

VIDEO ENTROPY DECODING WITH GRACEFUL DEGRADATION

BACKGROUND OF THE INVENTION

1. Field of the Invention

This invention generally relates to video decompression and, more particularly, to a system and method that permit a graceful degradation in video decoding, if the decoder has insufficient resources to present the decoded video in real-time.

2. Description of the Related Art

Complexity-scalable image/video decoding techniques are essential to applications where computation power is limited, and/or full resolution quality images are not necessary. Discrete cosine transform (DCT) processes are used in many popular image/video-coding systems, such as JPEG, MPEG-1-2-4, H.263, and H.264 systems. Inverse discrete cosine transform (IDCT) processing is widely recognized as one of the most computation-demanding processes of the image/video decoders. Conventionally, the approaches have been developed to simplify the IDCT process and save computation result in a trade off of added visual artifacts against a loss of resolution.

FIG. 1 is a drawing that illustrates a conventional two-dimensional (2D) 8×8 IDCT process (prior art). The 8×8 DCT coefficients undergo 8 horizontal one-dimensional (1D) IDCT transforms, followed by 8 vertical 1D IDCT transforms, to generate 8×8 image residuals in the space domain. In total, 16 1D IDCT operations are needed. Since the horizontal and vertical transforms are independent of each other, the same result is achieved if the process is begun with the vertical transforms and finished with horizontal transforms. The following discussion, however, will follow the process explicitly depicted in FIG. 1

The key to computation reduction is in the reduction of the number of 1D IDCT operations. The most straightforward way to reduce the number of IDCT computations is to set some of the high frequency DCT coefficients to zero value.

FIG. 2 depicts a few examples of reduced complexity DCT coefficient masks (prior art). The coefficients in the non-shaded area are set to zero value to reduce computation complexity. For example, when the 4×8 mask is applied, the resultant 2D IDCT process requires 4 horizontal and 8 vertical IDCT operations. In total, 12 1D IDCT operations are required. However, as mentioned above, the trade-off associated with a reduction in complexity is the degradation of visual quality. The visual artifacts become very annoying when strong image edges (such as the letter box boundary in movie materials) are present. For example, using a reduced complexity mask to decode a frame with a letter box boundary may result in the appearance of dark stripes in the image. These stripes are artifacts of the letter box boundary.

Many elements of a decoder can be simplified, trading video quality for a reduction in complexity. As described above, elements such as inverse transform or filtering can be skipped in small portions of the image, reducing complexity while giving a small impact on video quality. However, the serial nature of entropy decoding, based on either Variable Length Code (VLC) decoding or arithmetic coding, does not lend itself to this type of graceful degradation since an error decoding one symbol frequently renders the remaining data useless until the next synchronization point. Trying to save complexity, decoding one bit may result in the loss of an entire video frame. For this reason, entropy decoding typically forms a peak processing bottle-neck with non-graceful degradation. As a result, many decoders contain a dedicated entropy decoding unit designed to operate in the worst-case conditions. Other decoders simply generate errors when the entropy decoding is too complex. Complexity is reduced by discarding data with the associated loss of video quality.

The predictions made between frames that is typically described in video decoding is outside of the operation of an entropy decoding unit. An entropy decoder must maintain synchronization, or prediction within a frame, from a first macroblock (MB), to subsequently decoded MB. Each frame begins with a resynchronization point and so synchronization can be reestablished at each frame if needed. Although the synchronization, or prediction, used in the entropy decoder is from a previously decoded MB of the same frame, problems in decoding manifest themselves in the context of a series of frames. These frames have a hard decoding deadline. If one frame is "too slow", the entire sequence of video frames fails. In contrast, when decoding a single frame like an image via the Internet, a slow decoder means that the user simply waits a little longer for their image.

A worst-case estimate can used to determine the maximum rate of the decoder. However, a conservative worst-case estimate is not representative of normal conditions, and an average complexity is generally more practical consideration in the design of DSP decoder software. A decoder designed around the average complexity, however, has the problem of dealing with excessive spikes in decoding complexity that temporarily exceed the decoding power.

Generally, it is assumed that the complexity of received video is a constant, and designers typically work around a conservative value. In practice however, the video is rarely near this worst-case bound and fluctuates significantly. Unfortunately, when the video complexity rises, more resources are consumed. Therefore, any fluctuations in video complexity translate into a fluctuation in available resources. One technique used for monitoring this phenomena is the speed of decoding, which varies with both the available processing power and the video complexity. A low decoding speed can be inferred by any lateness in decoding pictures. A common phrase to refer to this slow decoding is "loss of real-time decoding".

The complexity becomes an issue when the set of operations required to decode the video exceeds the resources of the decoder. The sequence of operations required to decode the video can increase, or the available processing power may decrease when other operations are needed, for instance video decoding may be only one of many tasks running on a PC. The range of operations needed to decode a given number of bytes can vary dramatically—one pattern of bits may simply mean copy a block form the last frame, while another pattern may require complex subpixel interpolation, deblocking filtering, prediction weighting, or other steps. If a decoder is designed for worst-case complexity, as is often done for dedicated ASICs, this is not an issue. However, if the video decoder is part of a system, running on a programmable processor for instance, then a worst-case design may be costly to the system as a whole. With this kind of design a large amount of resources are sitting idle, waiting for a worst-case scenario, which rarely if ever happens. In a design less conservative than the complete worst-case, the question arises as to what to do if a portion of video requires more resources to decode than are available.

It would be advantageous if video entropy decoding could be gracefully degraded without losing synchronization between MBs in a frame.

SUMMARY OF THE INVENTION

Entropy decoding forms a processing bottleneck in many video decoding designs. The present invention permits complexity reduction in entropy decoding with a graceful reduction in video quality. This result is achieved through the realization that the entropy decoding of coefficient data can be conceptually divided into two portions: symbol decoding and coefficient reconstruction. Symbol decoding is a serial process based on either VLC or arithmetic coding. The symbol reconstruction involves interpreting the decoded symbols. The symbol decoding process is generally resynchronized rarely, once per frame or row of an image. However, the symbol reconstruction process is typically resynchronized each block of coefficients. Additionally, the symbol reconstruction process can be omitted with only a small impact on video quality. The impact is small since correct motion information and block types are still decoded. The present invention reduces entropy decoding complexity, while gracefully reducing video quality, by selectively skipping the symbol reconstruction portion of coefficient decoding.

Accordingly, a method is provided for gracefully degrading video quality in a video entropy decoding system. The method comprises: accepting a sequence of coded video frames; measuring the speed at which the video frames are decoded; in response to the decoding speed, varying the degree of data decoded in each macroblock (MB) of a frame; and, supplying decoded video data from every MB in the frame. Even though the degree of data decoded in each MB of the frame may vary, predictions from a first MB in a frame can still be used to decode a second MB in the frame. That is, synchronization is maintained between the first and second MB.

Varying the degree of data decoded in each MB of the frame includes: decoding a minimal amount of data in each MB in the frame; and, varying the level of decoding performed on each MB in the frame. Decoding a minimal amount of data in each MB in the frame includes decoding information including macroblock address, motion vectors, prediction modes, coefficient run and levels, and quantizer information.

More specifically, decoding a minimal amount of data in each MB in the frame includes completely decoding each symbol in the MB using a VLC or Context Adaptive VLC (CAVLC) algorithm. Varying the level of decoding includes selectively performing coefficient reconstruction of data such as simplified MB luma data, simplified MB section luma data, and simplified chroma data.

Additional details of the above-described method and a system for gracefully degrading video quality in a video entropy decoder are provided below.

BRIEF DESCRIPTION OF THE DRAWINGS

FIG. 4 is an exemplary set of software instructions that call degraded decoding functions.

FIG. 9 is a flowchart illustrating a method for gracefully degrading video quality in a video entropy decoding system.

FIG. 10 is a flowchart illustrating an alternate expression of a method for gracefully degrading video quality in a video entropy decoding system.

DETAILED DESCRIPTION

Figure 1:
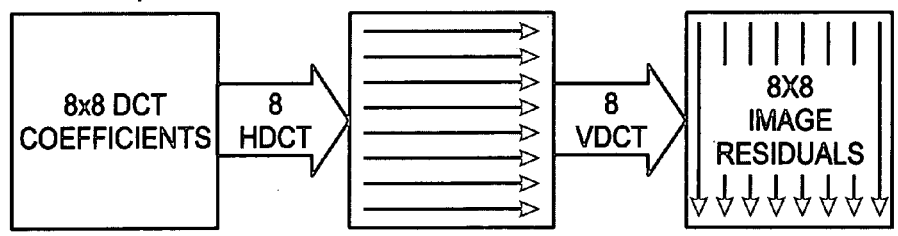
FIG. 1 is a drawing that illustrates a conventional two-dimensional (2D) 8×8 IDCT process (prior art).
Figure 2:
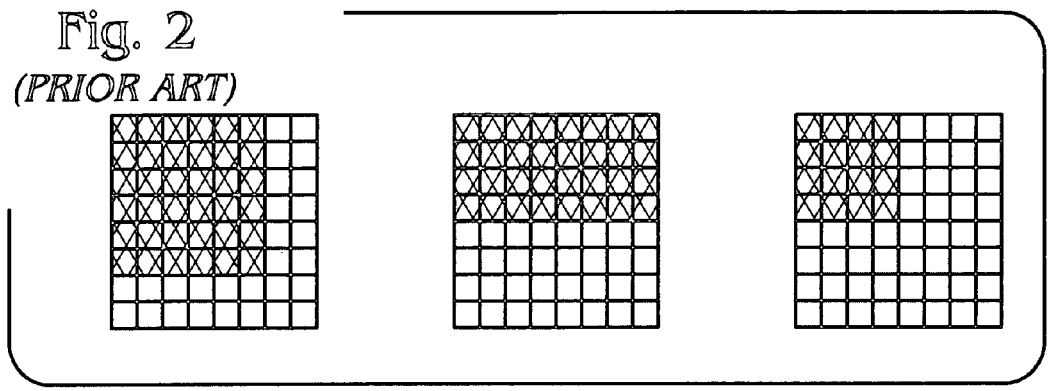
FIG. 2 depicts a few examples of reduced complexity DCT coefficient masks (prior art).
Figure 3:
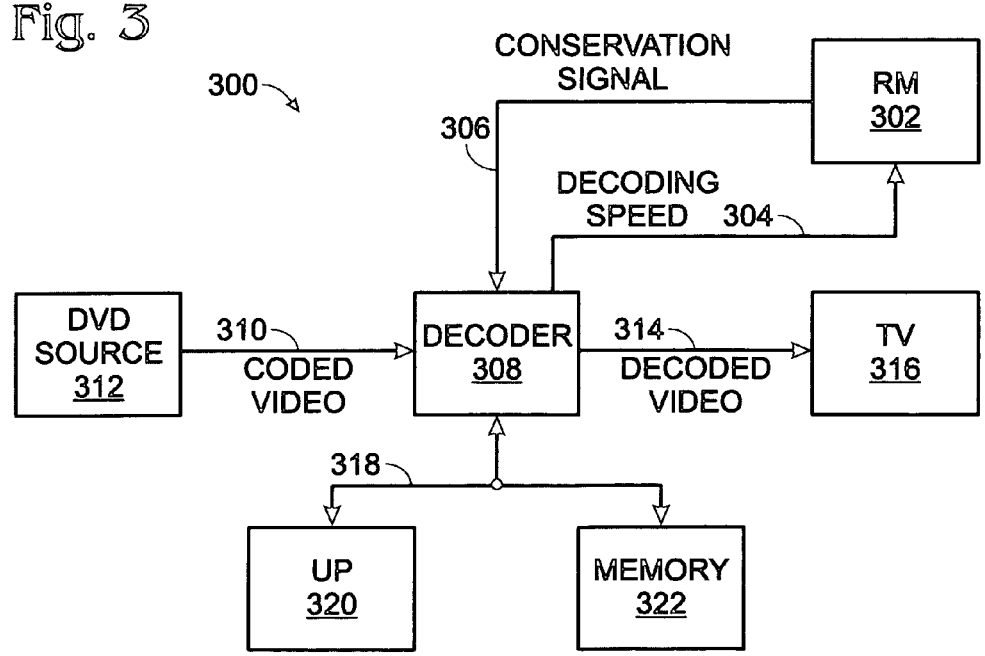
FIG. 3 is a schematic block diagram of a system for gracefully degrading video quality in a video entropy decoder.

FIG. 3 is a schematic block diagram of a system for gracefully degrading video quality in a video entropy decoder. The system 300 comprises a resource monitor (RM) 302 having an input on line 304 to accept a video decoding speed signal. The RM 302 supplies a conservation signal at an output on line 306, responsive to the decoding speed. A decoder 308 has an input on line 310 to accept a sequence of coded video frames from a source 312. Here, the source 312 is shown as a DVD player. However, in other aspects (not shown) the source can be an Internet service provider delivering content via the Internet, to name one example. The decoder 308 accepts video data encoded using a protocol such as H.261, H.262, H.263, H.264, MPEG1, MPEG2, or MPEG4.

The decoder 308 has an input on line 306 to accept the resource conservation signal. The decoder 308 varies the degree of data decoded in each macroblock (MB) of a frame in response to the conservation signal on 306. The decoder 308 has an output on line 314 to supply decoded video data from every MB in the frame. Here, the video output is shown being supplied to a television set 316. However, in other aspects (not shown) the video is supplied to a multimedia center, a personal computer, or a storage device to name a few examples.

The decoder has an output on line 304 to supply the decoded video speed signal. Also shown is an interface on line 318, which represents a connection between the decoder 308 a microprocessor 320, and a memory 322. The microprocessor 320 carries out processes, on instruction from the decoder 308, in the decompression of the received video. Typically, the microprocessor 320 is shared with other devices (not shown) besides the decoder 308, making access to the microprocessor a limited resource.

The decoder 308 supplies decoded video on line 314 and a decoding speed signal on line 304 responsive to fluctuations in the available decoding processing power, and fluctuations in the coded video data rate. As mentioned in the Background Section above, the data rate and complexity of the received video may vary, and an efficient decoder cannot necessary respond to the worst-case scenario.

Typically, the decoder 308 measures the speed at which the video frames are decoded by decoding a PTS/DTS (Presentation Time Stamp/Decoding Time Stamp) field in a video frame and sends this information in the decoding speed signal. The resource monitor 302 compares the PTS to the actual presentation time of the decoded video frame. The RM 302 generates a conservation signal to reduce the degree of data decoded if the actual presentation time is later than the PTS. Alternately, the comparison of the PTS to the actual presentation time may be carried out in the decoder 308 and the results of the comparison sent to the resource monitor 302. In another aspect, the DTS is compared to the actual decoding time. PTS and DTS are MPEG-4 terms, however, other protocols use similar concepts. Further, the use of the PTS or DTS is merely one example of "lateness thresholds". A soft decision technique using these, and other criteria, can be used to estimate how close a frame is to being late. Pre-emptive simplified decoding processes can be initiated as a result.

Typically, the conservation signal instructs the decoder 308 to perform the conventional complete decoding process. In this case the decoder 308 operates as a conventional device, and the invention is not practiced. However, if the resource monitor 302 senses that the decoder 308 has insufficient resources to cope with the received video stream, then the conservation signal instructs the decoder to vary the degree of data decoded in every MB of the frame. However, even as the degree of decoded data varies, predictions from a first MB can still be used to decode a second MB. Alternately stated, unlike conventional means of dealing with limited processing resources, the decoder 308 varies the degree of data decoded in the first and second MBs, while maintaining synchronization between the first MB and the second MB. Stated one other way, the decoder 308 is able to vary the degree of data decoded in the first and second MBs, while predicting motion from the first MB, to the second MB.

The decoder 308 varies the degree of data decoded in each MB of the frame by decoding a minimal amount of data in each MB in the frame, and by varying the level of decoding performed on each MB in the frame. The minimal amount of data decoded in each MB includes elements such as macroblock address, motion vectors, prediction modes, coefficient run and levels, and quantizer information. This information must be known to maintain synchronization.

A minimal amount of decoding is performed on ALL the data. The degree of decoding done in addition to this minimum varies. A minimum decoding of an MB is required for example, to determine the start of the next MB. The decoder 308 decodes a minimal amount of data in each MB of the frame by completely decoding each symbol in the MB using an algorithm such as Variable Length Code (VLC) or Context Adaptive VLC (CAVLC), as is conventional. However, unlike conventional processes, the decoder is able to selectively perform coefficient reconstruction. Alternately stated, the decoder 308 performs conventional symbol decoding, but varies the level of coefficient reconstruction. Symbol decoding is a serial process based on either VLC or arithmetic coding. The symbol reconstruction involves interpreting the decoded symbols. Typically, the decoder 308 is able to selectively perform coefficient reconstruction of data such as simplified MB luma data, simplified MB section luma data, or simplified chroma data.

More specifically, the decoder 308 accepts video frames as a matrix of discrete cosine transform (DCT) coefficients for each MB in the frame. The decoder selectively performs coefficient reconstruction by setting to zero the DCT coefficients of a matrix such as a MB luma matrix, MB section luma matrix, and chroma matrix. The process is selective in that the decoder may choose to perform these operations on some matrices, but not others, depending upon need. If resources are extremely limited for example, the decoder may simplify all the above-mentioned matrices. The process is also selective because the number of MBs with simplified decoding can be varied by need (available resources).

It should be noted that is some aspects (not shown), the resource monitor 302 may be an integral part of the decoder 308. It should also be understood that many of the above-mentioned elements may be enabled as software instructions stored in memory and executed by a microprocessor.

Functional Description

Conventionally, if the entropy decoding cannot keep up, and the entropy decoder looses synchronization between frames, decoding cannot resume until the next synchronization point in the bitstream. The location of these points is determined by the author of the video bitstream and the decoder may not be able to resume decoding, even if resources become available. This is all-or-nothing, non-graceful degradation. Since everything depends upon the entropy decoding, all decoding is suspended until the next resynchronization point, leaving a hole in the video where no information is available. The present invention entropy decoder can maintain synchronization, although it does not perform all the operations required for decoding. This reduction in operation at the decoder allows it to recover and then begin decoding fully again. The decoder does not need to wait until another resynchronization point since it remains synchronized, although it need not fully decode the video. Thus, the hole created by missing decoding information is eliminated. Additionally, while maintaining synchronization the decoder does produce limited information about the areas that were not fully decode. For instance, motion vectors, specifying from where data is to copied, are decoded correctly. This is valuable information and many conventional techniques for filling the hole, created by missing information caused by transmission errors, rely on estimating the unknown motion field.

The decoding of H.264 video is presented to illustrate the invention. H.264 uses the concept of macroblock common to most other video codecs. The problem addressed by the present invention concerns peaks in entropy decoding complexity, typically due to peaks in bit-rate caused by large number of coefficients. The invention also addresses the problem of limited processing resources. For each function foo of the coefficient entropy decoding process, an associated function foo_degraded is introduced. The degraded function differs in that the steps of coefficient reconstruction and, hence, the need to store many decoded symbols as well as computation, are eliminated. The selection between the original decoding function foo and the associated function foo_degraded is made for each block of a macroblock and based on a processing level, block, and macroblock type. With this control it is possible to revert back to full decoding at any block. The overhead of testing per block has been found to be insignificant, though coarser granularity can be used if overhead presents a problem.

Degraded Functions

The functions used for decoding a block of residual data in our H.264 decoder are listed below in Table 1, together with associated degraded functions.

TABLE 1

| Function | Function_degraded |
|---|---|
| DecodeMbCAVLC_Luma 16x16 | Never Degraded in this example |
| DecodeMbCAVLC_Luma4x4 | DecodeMbCAVLC_Luma4x4_degraded |
| DecodeMbCAVLC_Chroma | DecodeMbCAVLC_Chroma_degraded |

Degradation Algorithm

FIG. 4 is an exemplary set of software instructions that call degraded decoding functions. In the present invention implementation, the residual decoding function is the entry to the coefficient entropy decoding. In this example, Context Adaptive Variable Length Coding (CAVLC) is the only coding tool used, though this technique can clearly be generalized to other entropy coding tools such as Context Adaptive Binary Arithmetic Coding (CABAC). The residual decoding function illustrated below uses two flags degrade_luma and degrade_chrom to selectively control calling the full decoding functions or the low complexity degraded functions.

The _degraded functions differ from the full decode functions in that the descanning and sign determination of coefficients is eliminated, as is the need to store decoded values of run and level. Coefficient values are all left at zero, they are initially zero in both cases. The VLC decoding context is maintained so that intra macroblocks are fully decoded. Typically, degrade_chroma is set along with degrade_luma. Note when only degrade_chroma is set, the luma information is fully decoded.

TABLE 2

| Flag | Action | Impact (see FIGS. 7 and 8) |
| --- | --- | --- |
| Degrade_chroma | Coefficients zero for chroma blocks | Color Drift |
| Degrade_luma | Coefficients zero for luma blocks | Luma Drift |

Control of Degradation

In general, degraded decoding can be controlled by selecting a processing level. Switching between levels can be controlled by several parameters including, input buffer fullness, real-time measure, and Picture type (i.e., use full decoding for I picture). The processing level can be switched per macroblock without excessive overhead testing of the value of the level, though this is often implementation specific. Five processing levels are presented below. Levels 1 and 5 correspond to conventional techniques. Levels 2 and 3 impact quality insignificantly. At Level 4, the intra blocks are poor. The advantage of Level 4 processing, however, is that symbol decoding continues, allowing later blocks to be decoded rather than just discarding subsequent data, as happens in the conventional case of Level 5. Further, the continued decoding permits lower level processing (Level 1-3) if sufficient resources become available.

TABLE 3

| Level | Action | Impact |
| --- | --- | --- |
| 1 | Full decoding | None |
| 2 | Coefficients for chroma of Predicted blocks zeroed, Motion vectors correct | Small color drift |
| 3 | Coefficients for Luma of Predicted blocks zeroed, Motion vectors correct | Small luma drift |
| 4 | Coefficients for all blocks zeroed | Mismatch at Intra Blocks |
| 5 | Stop Decoding-resynchronize at next possibility | Error concealment enabled |

Illustration of Quality Degradation

This present invention technique is aimed at combating spikes in entropy decoding complexity. However, to illustrate the quality degradation associated to degrade_chroma and the pair (degrade_luma and degrade_chroma), results are shown after decoding 15 frames of a video sequence. The sequence begins with a single I-picture and then the indicated degradation techniques are applied for the remaining pictures. Degraded images based on decoding with the specified flag(s) on for the entire sequence are presented.

Figure 5:
FIG. 5 illustrates the fifteenth frame of a sequence in which all MBs are fully decoded.

FIG. 5 illustrates the fifteenth frame of a sequence in which all MBs are fully decoded. The image, initially decoded in color, is depicted as a black-and-white image for printing.

Figure 6:
FIG. 6 illustrates the fifteenth frame decoded using a conventional process, where synchronization is lost between macroblocks.

FIG. 6 illustrates the fifteenth frame decoded using a conventional process, where synchronization is lost between macroblocks. As shown, once synchronization is lost, all data in a sequence is lost until synchronization can be reestablished. As shown, the results of loss of synchronization are a "hole" in the decoded sequence of MBs. In practice, it is convention to use an algorithm that substitutes data for a hole resulting from loss of synchronization during entropy decoding. But all the compressed video corresponding to hole MBs is lost, and is unavailable for use with such an algorithm.

Figure 7:
FIG. 7 illustrates the fifteenth frame of the sequence decoded with chroma degraded for all inter macroblocks.

FIG. 7 illustrates the fifteenth frame of the sequence decoded with chroma degraded for all inter macroblocks. As a back-and-white image, the degradation is difficult to detect. As a color image, a viewer may notice a minor degradation in image quality.

Figure 8:
FIG. 8 illustrates the fifteenth frame of the sequence decoded with both luma and chroma degraded for all inter macroblocks.

FIG. 8 illustrates the fifteenth frame of the sequence decoded with both luma and chroma degraded for all inter macroblocks. As a back-and-white image, the degradation is barely noticeable. As a color image, a viewer would notice a slightly blurred image quality. However, even the blurred image is considerably more desirable that the "hole" depicted in FIG. 6.

FIG. 9 is a flowchart illustrating a method for gracefully degrading video quality in a video entropy decoding system. Although the method is depicted as a sequence of numbered steps for clarity, the ordering of the steps does not necessarily follow the numbering. It should be understood that some of these steps may be skipped, performed in parallel, or performed without the requirement of maintaining a strict order of sequence. Some details of the method may be better understood in context of the explanations of FIGS. 3-4, above. The method starts at Step 800.

Step 802 accepts a sequence of coded video frames. For example, video data is accepted encoded in a protocol such as H.261, H.262, H.263 H.264, MPEG1, MPEG2, or MPEG4. Step 804 measures the speed at which the video frames are decoded. Step 806 varies the degree of data decoded in each MB of a frame in response to the decoding speed. Step 808 supplies decoded video data from every MB in the frame. In one aspect, Step 808 supplies post-coding information represented by a second plurality of data bits for a MB, less than the maximum first plurality of bits than can be (conventionally) decoded for the MB.

In one aspect, varying the degree of data decoded in each MB of the frame in Step 806 includes using predictions from a first MB in a frame to decode a second MB in the frame. Using predictions from the first MB in the frame to decode a second MB in the frame includes maintaining synchronization between the first MB and the second MB. That is, using predictions from the first MB in the frame to decode the second MB in the frame includes predicting motion from the first MB, to the second MB.

In another aspect, varying the degree of data decoded in each MB of the frame in Step 806 includes substeps. Step 806a decodes a minimal amount of data in each MB in the frame. Step 806b varies the level of decoding performed on each MB in the frame.

Decoding a minimal amount of data in each MB in the frame in Step 806a includes decoding information such as macroblock address, motion vectors, prediction modes, coefficient run and levels, and quantizer information. This information is more loosely classified as header, prediction, and residual information.

Decoding a minimal amount of data in each MB in the frame in Step 806a includes completely decoding each symbol in the MB using an algorithm such as VLC or CAVLC. Varying the level of decoding in Step 806b includes selectively performing coefficient reconstruction.

Generally, selectively performing coefficient reconstruction (Step 806b) includes decoding data such as simplified MB luma data, simplified MB section luma data, or simplified chroma data. More specifically, accepting a sequence of coded video frames in Step 802 includes accepting a matrix of discrete cosine transform (DCT) coefficients for each MB in the frame. Then, selectively performing coefficient reconstruction in Step 806b includes setting to zero the DCT coefficients of a matrix such as a MB luma matrix, MB section luma matrix, or chroma matrix.

Measuring the speed at which the video frames are decoded in Step 804 includes measuring variations in decoding speed responsive to: fluctuations in the available decoding processing power; and, fluctuations in the coded video data rate. In one aspect, measuring the speed at which the video frames are decoded in Step 804 includes substeps. Step 804a decodes a PTS/DTS field of a video frame. Step 804b compares the PTS to the actual presentation time of the decoded video frame. Then, varying the degree of data decoded in Step 806 includes reducing the degree of data decoded if the actual presentation time is later than the PTS.

FIG. 10 is a flowchart illustrating an alternate expression of a method for gracefully degrading video quality in a video entropy decoding system. The method starts at Step 900. Step 902 accepts a sequence of coded video frames, each frame including a plurality of MBs. Step 904 accesses processing resources insufficient to completely decode the MBs in a frame. Step 906 partially decodes each MB in the frame. Step 908 maintains synchronization between a prior MB in the frame, and a subsequent MB in the frame. Step 910 supplies at least a portion of decoded video data from each MB in the frame. Alternated stated, Step 910 guarantees the delivery of data from every MB in a frame, regardless of the complexity of the received video, or the available processing resources. In one aspect, maintaining synchronization between the prior MB and the subsequent MB in Step 908 includes supplying entropy prediction information from the prior MB to decode the subsequent MB.

A system and method have been presented for gracefully degrading video quality in a video entropy decoder. A few examples have been presented of specific implementations. Likewise, examples have been given to illustrate the use of the invention. However, the invention is not limited to merely these examples. Other variations and embodiments of the invention will occur to those skilled in the art.

I claim:

1. A method for gracefully degrading video quality in a video entropy decoding system, the method comprising:
   a decoder accepting a sequence of coded video frames;
   a resource monitor measuring decoding processing power required to decode the video frames;
   in response to the required decoding processing power, the decoder varying the level of decoding processing for each macroblock (MB) of the video frame, where the level of decoding processing is sufficient to decode at least a minimal amount of data in each MB as follows:
      completely decoding each symbol in the MB using an algorithm selected from the group including Variable Length Code (VLC) and Context Adaptive VLC (CAVLC);
      selectively performing coefficient reconstruction; and
   the decoder supplying decoded video data from every MB in the frame.

2. The method of claim 1 wherein decoding at least the minimal amount of data in each MB of the frame includes using predictions from a first MB in a frame to decode a second MB in the frame.

3. The method of claim 2 wherein using predictions from the first MB in the frame to decode a second MB in the frame includes maintaining synchronization between the first MB and the second MB.

4. The method of claim 3 wherein decoding the minimal amount of data in each MB in the frame includes decoding information including macroblock address, motion vectors, prediction modes, coefficient run and levels, and quantizer information.

5. The method of claim 2 wherein using predictions from the first MB in the frame to decode the second MB in the frame includes predicting motion from the first MB, to the second MB.

6. The method of claim 1 wherein selectively performing coefficient reconstruction includes decoding data selected from the group including simplified MB luma data, simplified MB section luma data, and simplified chroma data.

7. The method of claim 6 wherein accepting a sequence of coded video frames includes accepting a matrix of discrete cosine transform (DCT) coefficients for each MB in the frame; and
   wherein selectively performing coefficient reconstruction includes setting to zero the DCT coefficients of a matrix selected from the group including a MB luma matrix, MB section luma matrix, and chroma matrix.

8. The method of claim 1 wherein accepting the sequence of coded video frames includes accepting video data encoded using a protocol selected from the group including H.261, H.262, H.263 H.264, MPEG1, MPEG2, and MPEG4.

9. The method of claim 1 wherein supplying decoded video data from every MB in the frame includes supplying postcoding information represented by a second plurality of data bits for, a MB, less than the maximum first plurality of bits than can be decoded for the MB.

10. The method of claim 1 wherein measuring the decoding processing required to decode the video frames includes measuring variations in required decoding processing power responsive to:
    fluctuations in the available decoding processing power; and
    fluctuations in the coded video data rate.

11. The method of claim 1 wherein measuring the decoding processing power required to decode the video frames includes:
    decoding a PTS/DTS (Presentation Time Stamp/Decoding Time Stamp) field of a video frame;
    comparing the PTS to the actual presentation time of the decoded video frame; and,
    wherein varying the level of decoding processing for each MB of the frame includes reducing the amount of data decoded if the actual presentation time is later than the PTS.

12. In a decoder device including a microprocessor, a method for gracefully degrading video quality in a video entropy decoding system enabled as processor instructions stored in a processor-readable memory medium, the method comprising:
    a decoder accepting a sequence of coded video frames, each frame including a plurality of macroblocks (MBs);
    accessing processing resources insufficient to completely decode the MBs in a frame;
    adjusting the level of MB decoding processing to ensure at least partial decoding of each MB in the frame, where the partially decoding comprises decoding each symbol in the MB using an algorithm selected from the group including Variable Length Code (VLC) and Context Adaptive VLC (CAVLC), and varying the level of decoding performed by selectively performing coefficient reconstruction;

maintaining synchronization between a prior MB in the frame, and a subsequent MB in the frame; and supplying at least a portion of decoded video data from each MB in the frame.

13. The method of claim 12 wherein maintaining synchronization between the prior MB and the subsequent MB includes supplying entropy prediction information from the prior MB to decode the subsequent MB.

14. A system for gracefully degrading video quality in a video entropy decoder, the system comprising:

a resource monitor having an input to accept a required decoding processing power measurement signal and supplying a conservation signal at an output, responsive to the required decoding processing power; and, a decoder having an input to accept a sequence of coded video frames and an input to accept the resource conservation signal, the decoder varying the level of decoding processing in each macroblock (MB) of a frame in response to the conservation signal, where the level of decoding processing is sufficient to ensure that at least a minimal amount of data is decoded from each MB by completely decoding each symbol in the MB using an algorithm selected from the group including Variable Length Code (VLC) and Context Adaptive VLC (CAVLC), and varying the level of decoding performed by selectively performing coefficient reconstruction, the decoder having an output to supply decoded video data from every MB in the frame and an output to supply the required decoding processing power measurement signal.

15. The system of claim 14 wherein the decoder varies the level of decoding processing in every MB of the frame, while using predictions from a first MB to decode a second MB.

16. The system of claim 15 wherein the decoder varies the level of decoding processing in the first and second MBs, while maintaining synchronization between the first MB and the second MB.

17. The system of claim 16 wherein the decoder decodes the minimal amount of data in each MB, including a macroblock address, motion vectors, prediction modes, coefficient run and levels, and quantizer information.

18. The system of claim 15 wherein the decoder varies the level of decoding processing in the first and second MBs, while predicting motion from the first MB, to the second MB.

19. The system of claim 14 wherein the decoder selectively performs coefficient reconstruction of data selected from the group including simplified MB luma data, simplified MB section luma data, and simplified chroma data.

20. The system of claim 19 wherein the decoder accepts video frames as a matrix of discrete cosine transform (DCT) coefficients for each MB in the frame, and selectively performs coefficient reconstruction by setting to zero the DCT coefficients of a matrix selected from the group including a MB luma matrix, MB section luma matrix, and chroma matrix.

21. The system of claim 14 wherein the decoder accepts video data encoded using a protocol selected from the group including H.261, H.262, H.263, H.264, MPEG1, MPEG2, and MPEG4.

22. The system of claim 14 wherein the decoder supplies decoded video and the required decoding processing power measurement speed signal responsive to fluctuations in the available decoding processing power, and fluctuations in the coded video data rate.

23. The system of claim 14 wherein the decoder measures the required decoding processing power by decoding a PTS/DTS (Presentation Time Stamp/Decoding Time Stamp) field in a video frame, and comparing the PTS to the actual presentation time of the decoded video frame; and, wherein the resource monitor generates a conservation signal to reduce the amount of data decoded if the actual presentation time is later than the PTS.

* * * * *